United States Patent
Suzui et al.

(10) Patent No.: US 6,493,246 B2
(45) Date of Patent: Dec. 10, 2002

(54) POWER CONVERSION WITH STOP CONVERSION DURING LOW INTEGRATED POWER CONDITIONS

(75) Inventors: Masaki Suzui, Kyoto (JP); Nobuyoshi Takehara, Kyoto (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/961,328

(22) Filed: Sep. 25, 2001

(65) Prior Publication Data

US 2002/0041505 A1 Apr. 11, 2002

(30) Foreign Application Priority Data

Sep. 29, 2000 (JP) ........................ 2000-299976

(51) Int. Cl.$^7$ .............................................. H02M 7/12
(52) U.S. Cl. ......................................... 363/95; 323/906
(58) Field of Search ........................... 323/906; 363/95, 363/97, 98

(56) References Cited

U.S. PATENT DOCUMENTS

| | | | | |
|---|---|---|---|---|
| 4,251,735 A | * | 2/1981 | Coleman | 363/95 |
| 4,375,662 A | * | 3/1983 | Baker | 363/95 |
| 4,649,334 A | * | 3/1987 | Nakajima | 363/95 |
| 4,667,283 A | * | 5/1987 | Seki et al. | 363/95 |
| 4,916,382 A | * | 4/1990 | Kent | 363/95 |
| 5,268,832 A | * | 12/1993 | Kandatsu | 363/95 |
| 5,548,504 A | | 8/1996 | Takehara | 363/65 |
| 5,592,074 A | | 1/1997 | Takehara | 363/131 |
| 5,621,300 A | | 4/1997 | Sato et al. | 320/5 |
| 5,654,883 A | * | 8/1997 | Takehara et al. | 363/95 |
| 5,669,987 A | | 9/1997 | Takehara et al. | 136/244 |
| 5,714,869 A | | 2/1998 | Tamechika et al. | 320/30 |
| 5,751,133 A | | 5/1998 | Sato et al. | 320/13 |
| 5,869,956 A | | 2/1999 | Nagao et al. | 323/299 |
| 5,892,354 A | | 4/1999 | Nagao et al. | 323/299 |
| 5,923,158 A | | 7/1999 | Kurokami et al. | 323/299 |
| 5,955,885 A | | 9/1999 | Kurokami et al. | 324/426 |
| 5,986,354 A | | 11/1999 | Nagao et al. | 307/64 |
| 6,046,919 A | * | 4/2000 | Madenokouji et al. | 363/98 |
| 6,081,104 A | * | 6/2000 | Kern | 363/97 |
| 6,101,073 A | | 8/2000 | Takehara | 361/42 |
| 6,111,767 A | * | 8/2000 | Handleman | 363/95 |
| 6,278,052 B1 | | 8/2001 | Takehara et al. | 136/244 |
| 6,304,468 B2 | * | 10/2001 | Ichinose et al. | 363/95 |
| 6,320,769 B2 | | 11/2001 | Kurokami et al. | 363/56.03 |

FOREIGN PATENT DOCUMENTS

| | | | | |
|---|---|---|---|---|
| JP | 62-293937 | 4/1996 | | H02J/1/00 |
| JP | 10-004631 | 1/1998 | | H02J/3/38 |
| JP | 10-336901 | 12/1998 | | H02J/3/38 |
| JP | 2000 23367 | 1/2000 | | H02J/3/38 |

* cited by examiner

Primary Examiner—Jeffrey Sterrett
(74) Attorney, Agent, or Firm—Fitzpatrick, Cella, Harper & Scinto

(57) ABSTRACT

In a solar power generation apparatus, when power necessary for a control circuit and the like is supplied from the load side of an inverter, a period from when the input voltage becomes lower than a threshold voltage at which the inverter should be stopped to when the inverter is stopped after the elapse of a predetermined time includes a period when power consumed by the inverter become larger than power output from the inverter, i.e., power is wasted. To solve this problem, input power is integrated for a predetermined time to calculate integrated electric energy. The calculated integrated electric energy W1 is compared with a threshold value Y1. If W1<Y1, a gate block signal is output to stop the operation of the inverter. As the threshold value Y1, a value corresponding to the product of the non-load power of the inverter and the predetermined time T1 is set.

10 Claims, 13 Drawing Sheets

US 6,493,246 B2

POWER CONVERSION WITH STOP CONVERSION DURING LOW INTEGRATED POWER CONDITIONS

FIELD OF THE INVENTION

The present invention relates to a power converting apparatus, control method thereof, and generator and, more particularly, to a power converting apparatus such as an inverter used for a solar power generation apparatus and a control method thereof.

BACKGROUND OF THE INVENTION

Power generated by a solar battery for generating power in accordance with sunlight is small in the morning/evening or in a cloudy/rainy day. If the generated power is small, an inverter in the solar power generation apparatus connected to a commercial electric power system (to be simply referred to as a "system" hereinafter) may be repeatedly activated and stopped. For this reason, an operation method for suppressing unnecessary stop of the inverter is required. Such operation methods are disclosed in, e.g., Japanese Patent No. 2509187 in which when the direct current input voltage of an inverter is equal to more than a threshold value, the inverter is activated after the elapse of a predetermined time, and Japanese Patent Laid-Open No. 2000-23367 in which when the direct current input voltage of an inverter is less than a threshold value, the inverter is stopped after the elapse of a predetermined time.

As shown in FIG. 1, when a direct current input voltage V of an inverter abruptly drops, input power P1 also abruptly drops together. When power (to be sometimes referred to as "non-load power" hereinafter) necessary for, e.g., the control circuit of the inverter is supplied from the load side of the inverter, such as a system, a period from when the input voltage V becomes lower than a threshold voltage V1 at which the inverter should be stopped, and the inverter is stopped after the elapse of a predetermined time may include a period when power consumed by the inverter become larger than power output from the inverter, i.e., power is wasted.

As shown in FIG. 2, if the input voltage V fluctuates near the threshold voltage V1, the operation of the inverter may not be stopped, and power may be wasted.

If the predetermined time is shortened to suppress wasteful power consumption, activation and stop of the inverter may be repeated at high probability.

SUMMARY OF THE INVENTION

The present invention has been made to solve the above-described problems individually or altogether, and has as its object to suppress wasteful power consumption of a power converting apparatus.

It is another object of the present invention to suppress unnecessary stop of a power converting apparatus.

In order to achieve the above objects, according to a preferred aspect of the present invention, a power converting apparatus comprising a power converter, arranged to convert direct current power to alternating current power, a measurement unit, arranged to measure input or output power of said power converter and calculate integrated power for every predetermined period on the basis of the measured power; and a controller, arranged to stop conversion operation of said power converter when the integrated power is less than a predetermined value is disclosed.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENT

A generator according to an embodiment of the present invention will be described below in detail with reference to the accompanying drawings.

[Arrangement]

Figure 1:
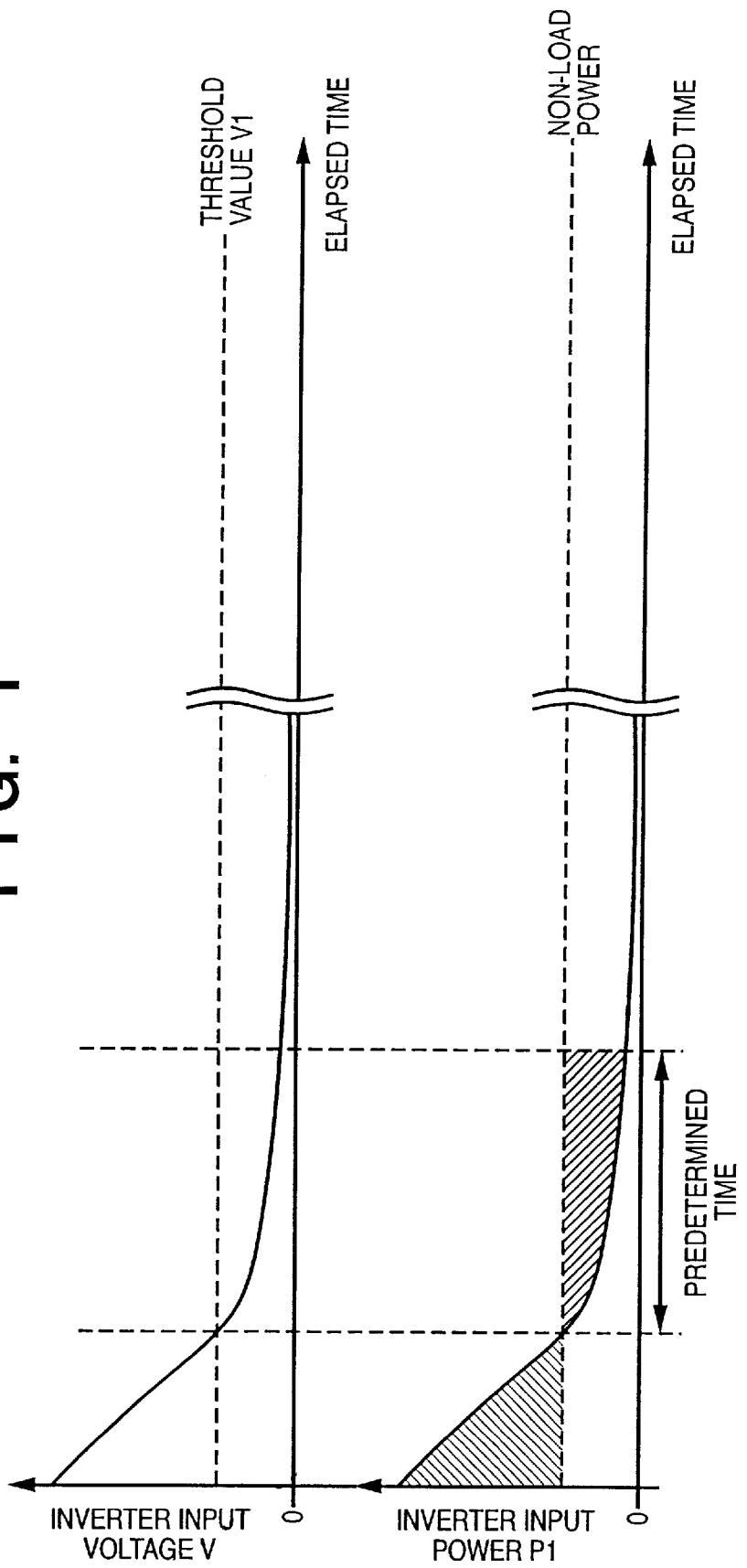
FIG. 1 is a view for explaining a situation in which the direct current input voltage and power of an inverter abruptly drop.
Figure 2:
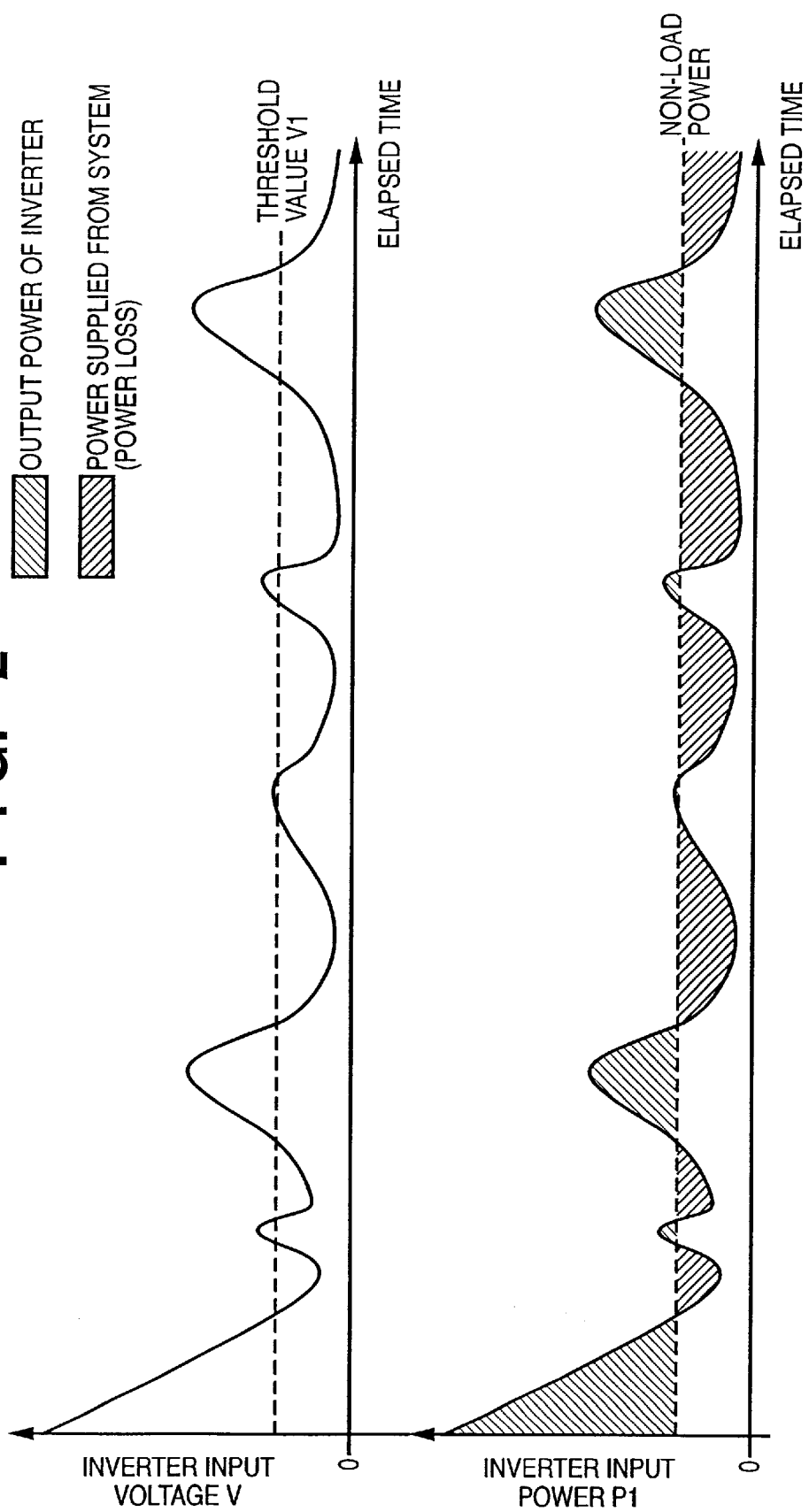
FIG. 2 is a view for explaining a case in which the direct current input voltage of an inverter fluctuates near a threshold voltage V1.
Figure 3:
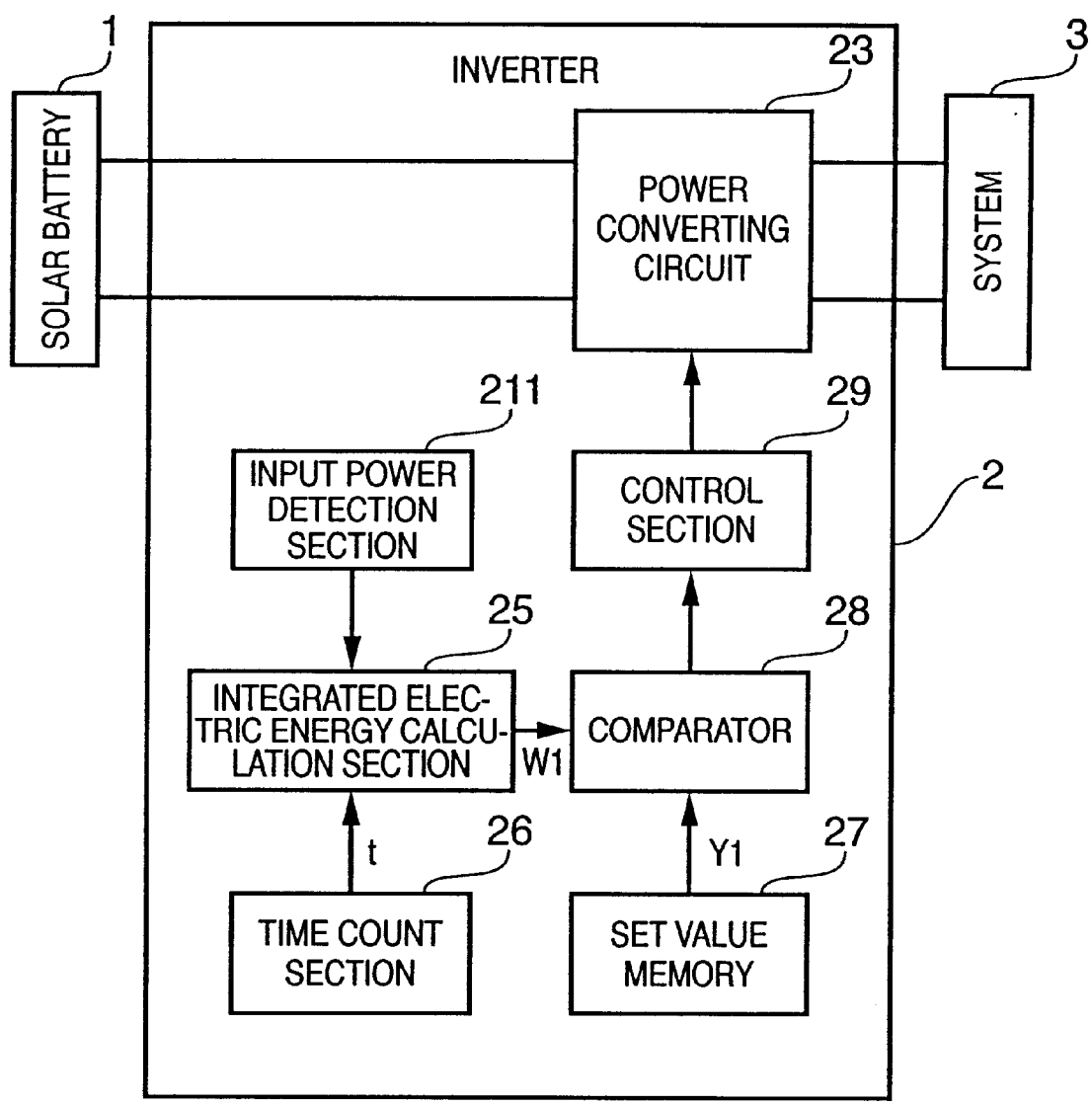
FIG. 3 is a block diagram showing the arrangement of a system interconnection solar power generation apparatus.

FIG. 3 is a block diagram showing the arrangement of a system interconnection solar power generation apparatus including an inverter 2. The inverter 2 has the circuit arrangement of a general system interconnection inverter.

A solar battery 1 uses amorphous silicon, crystallite silicon, polysilicon, single-crystal silicon, or a combination thereof, or a compound semiconductor. Normally, a solar battery array is formed by combining a plurality of solar battery modules in series and parallel such that a desired voltage and current can be obtained. The number of solar battery modules in the array is not limited.

The inverter 2 converts direct current power input from the solar battery 1 to alternating current power and outputs it to a system 3. The system 3 is a general commercial electric power system but can take any form such as a non-utility power generation system in a factory.

Inverter

A power converting circuit 23 comprises a converter circuit, inverter circuit, interactive reactor and the like.

An input power detection section 211 detects input power P1 of the inverter 2 and outputs the detection result to an integrated electric energy calculation section 25. The integrated electric energy calculation section 25 integrates the input power P1 during a predetermined time T1 and outputs the integration result, i.e., an integrated electric energy W1 to a comparator 28.

A time count section 26 outputs a signal t representing a timing or time to the integrated electric energy calculation section 25. A threshold value Y1 of the integrated electric energy W1 at which the operation of the inverter 2 should be stopped is stored in a set value memory 27. The comparator 28 compares the integrated electric energy W1 with the threshold value Y1, and when W1<Y1, outputs a stop signal to a control section 29.

The control section 29 controls the entire inverter 2 and outputs a gate drive signal to switching elements in the converter circuit and inverter circuit of the power converting circuit 23. Upon receiving a stop signal from the comparator 28, the control section 29 outputs a gate block signal to the power converting circuit 23. The control section 29 also has a connection protecting function and inverter protecting function as well as a boosting control function, output waveform control function, activation/stop control function, and MPPT (Maximum Power Point Tracking) function, which are generally provided in a system interconnection inverter. A detailed description of these functions will be omitted.

The control section 29 is formed from a CPU, DSP (Digital Signal Processor), one-chip microprocessor having a memory and I/O, A/D converter, analog circuit, and the like. When a CPU or DSP that is improving its performance and cost recently is used, various control operations can be implemented by software, and various advantages can be obtained in reducing the size and cost of the inverter 2 and improving the degree of freedom in its design.

The generator of the embodiment is not limited to the above arrangement. Any other arrangement capable of suppressing a power wasting period when the input power of the generator decreases, and power consumed by the inverter becomes larger than power output from the inverter can be employed. Any other arrangement capable of stopping the operation of the power converting apparatus on the basis of the integrated value or average value of input power or output power so as to suppress the period can be employed. Hence, the output power can take any form such as alternating current power or direct current power, and the system can also take any form such as a system interconnection type or stand-alone (isolated operation) type. In addition, the supply source of non-load power to the generator is not particularly limited unless the non-load power is wholly supplied from the input (solar battery 1) side.

[Control]

Figure 4:
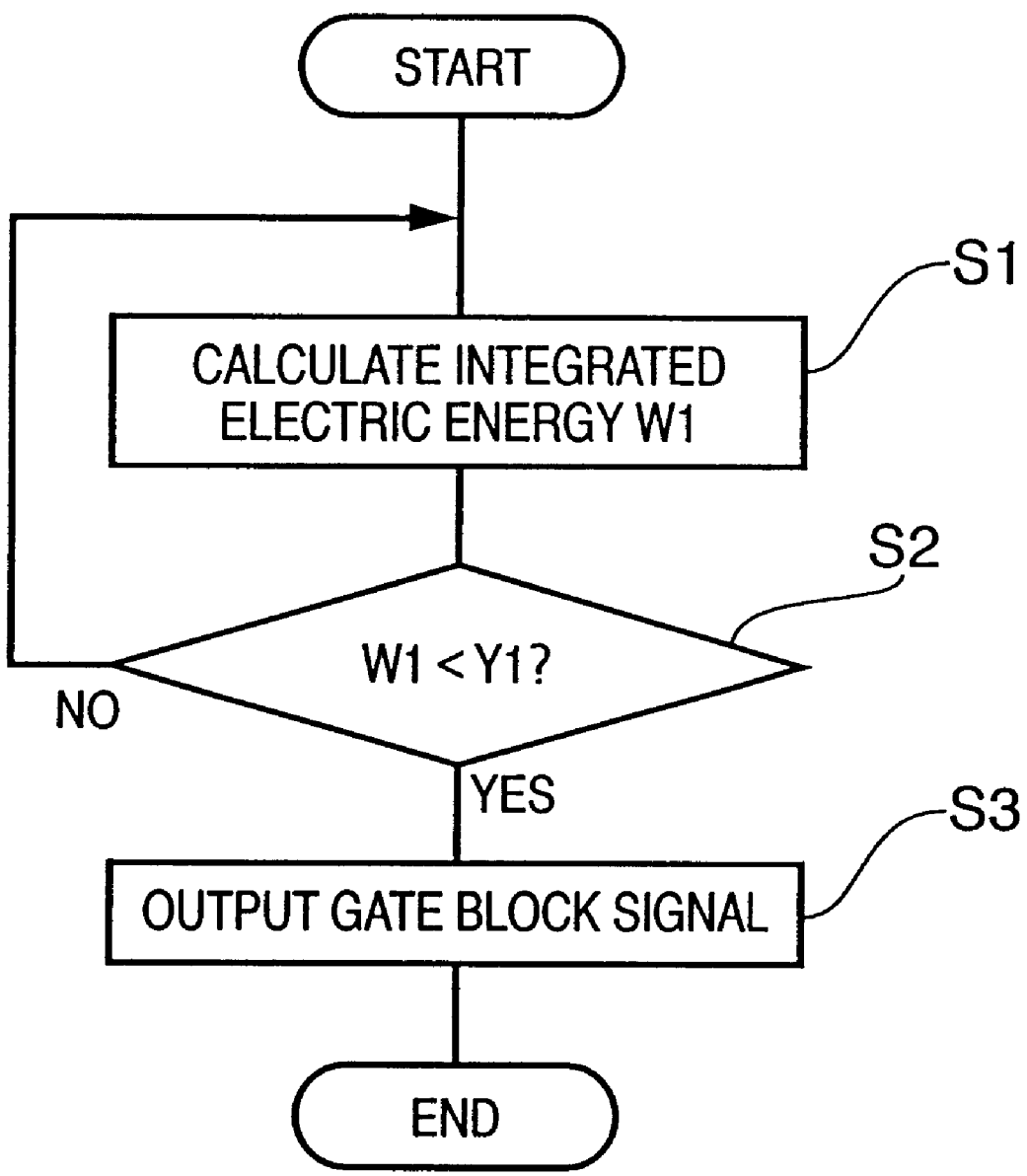
FIG. 4 is a flow chart for explaining a basic inverter stopping method.

FIG. 4 is a flow chart for explaining a basic inverter stopping method.

During the predetermined time T1, the input power P1 is integrated to calculate the integrated electric energy W1 (S1). The calculated integrated electric energy W1 and threshold value Y1 are compared (S2). If W1<Y1, a gate block signal is output to stop the operation of the inverter 2. When W1≧Y1, the flow returns to step S1.

Under this control, when the integrated electric energy W1 is smaller than the threshold value Y1, the operation of the inverter 2 is stopped. Hence, when the threshold value Y1 corresponding to the product of the non-load power of the inverter 2 and the predetermined time T1 is set, and the input power P1 continuously becomes smaller than the non-load power, the operation of the inverter 2 can be stopped. The timing when the integrated electric energy W1 becomes smaller than the threshold value Y1 changes depending on the gradient of the decrease in input power P1 assuming that the input power P1 smoothly decreases.

Since control for stopping the operation of the inverter 2 is done on the basis of the integrated electric energy W1 as the integrated value of the input power P1, unnecessary stop of the inverter 2 can be suppressed even when the power generated by the solar battery 1 is small or varies.

The method of stopping the inverter 2 of this embodiment does not depend on the activation method. Hence, a description of the activation method will be omitted.

Detailed methods of stopping the inverter 2 will be described below as examples.

FIRST EXAMPLE

Figure 5:
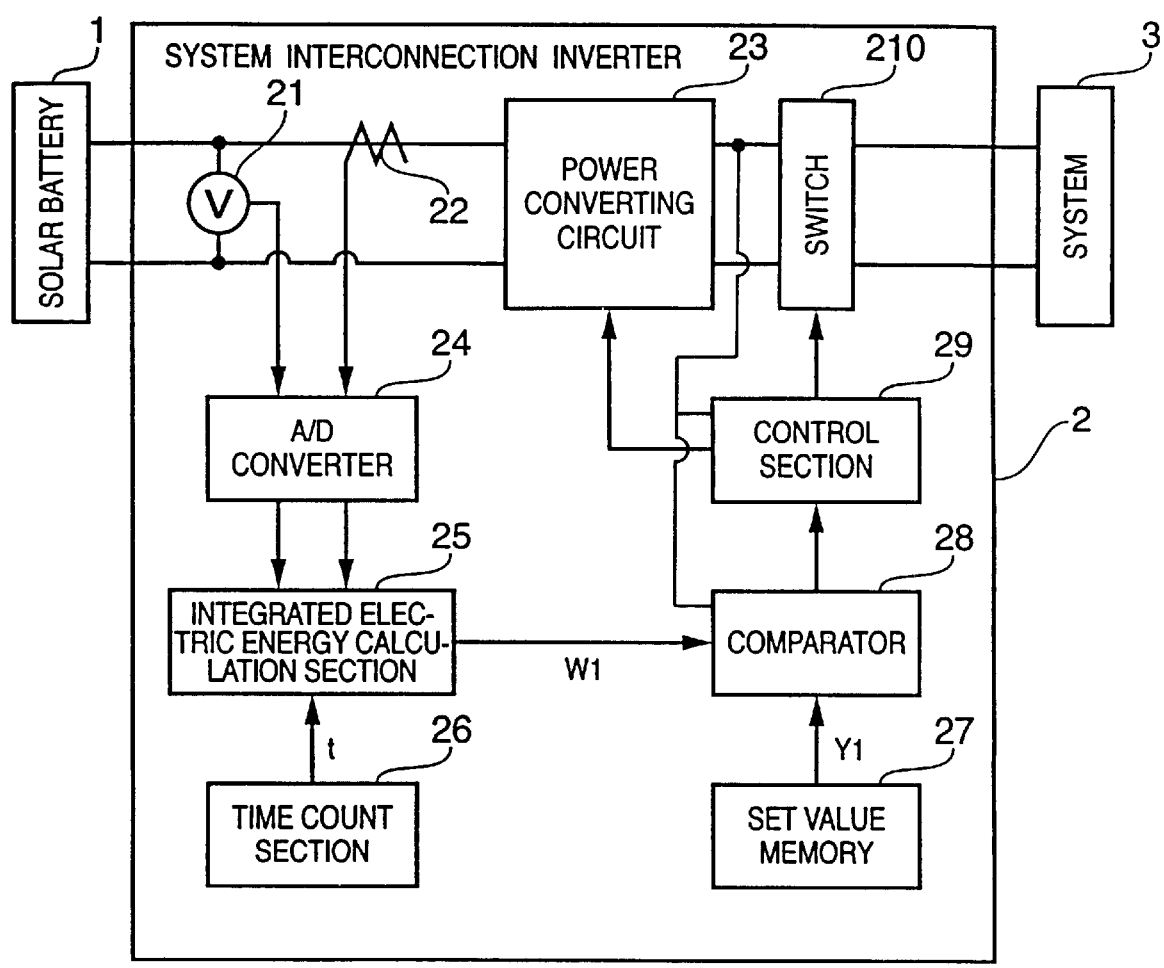
FIG. 5 is a block diagram showing the detailed arrangement of an inverter of the first example.

FIG. 5 is a block diagram showing the detailed arrangement of an inverter 2 of the first example. The non-load power of the inverter 2 is 20 W. As a solar battery 1, a solar battery module for outputting power of 2 kW under standard solar radiation (irradiance of 1 kW/m$^2$) is used. A system 3 is a single-phase three-wire system with an output of 200 V at 60 Hz.

Figure 6:
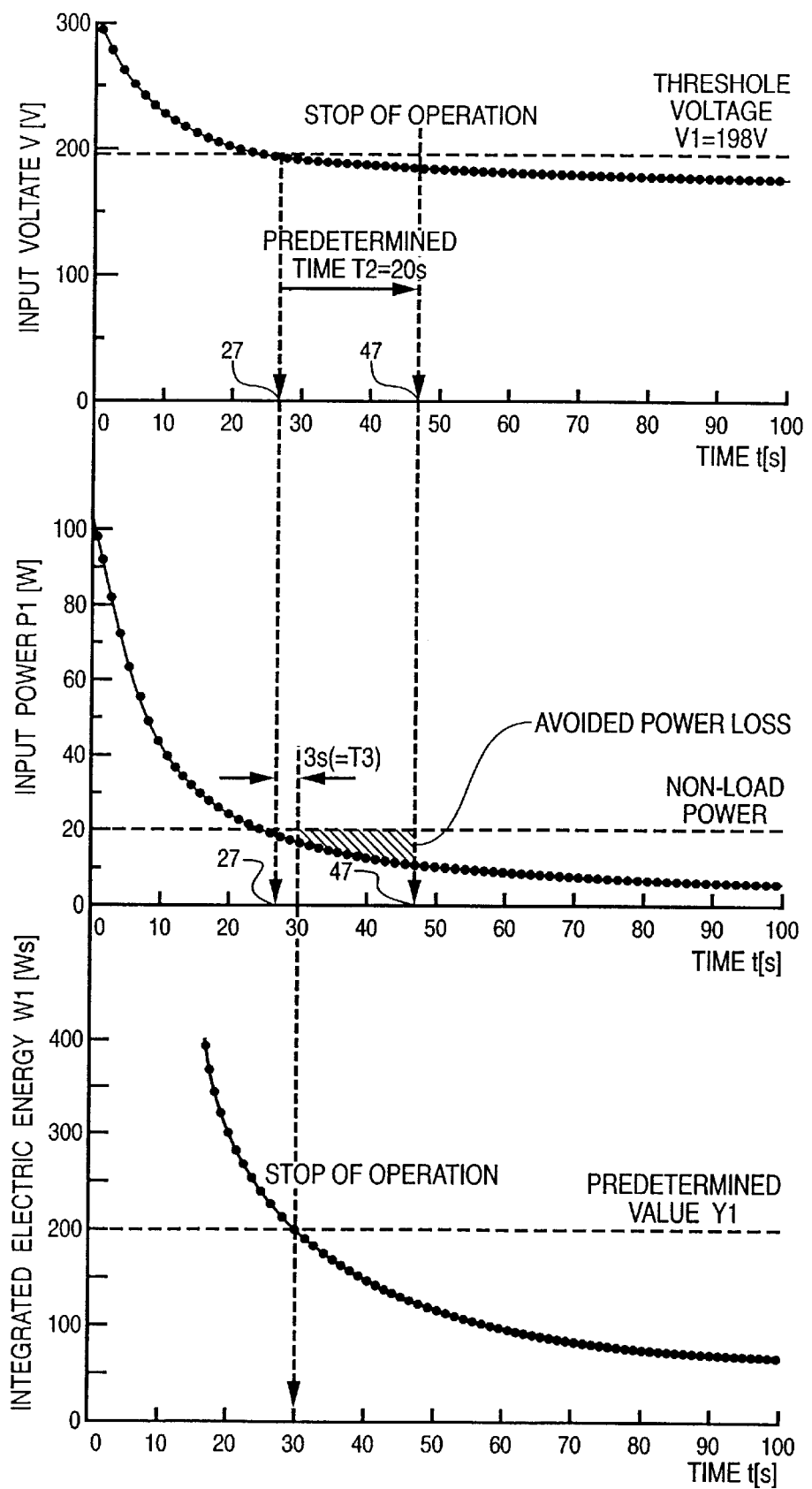
FIG. 6 shows timing charts showing the relationship between an input voltage V, input power P1, and integrated electric energy W1.

FIG. 6 shows timing charts showing the relationship between an input voltage V [V], input power P1 [W], and integrated electric energy W1 [Ws] at time t [s]. Since solar radiation varies in units of seconds, the sampling frequency of an A/D converter (to be described later) can be several Hz. The sampling frequency of the A/D converter is set at 1 Hz. Hence, a time count section 26 outputs a signal t every second.

Stopping Method of Example

To appropriately stop the operation of the inverter 2 when the input power P1 is smaller than the non-load power and to suppress unnecessary stop of the inverter 2, an integration time T1 for the input power P1 is set at 9 sec. Hence, a threshold value Y1 at which the inverter 2 should be stopped is set at 200 Ws (=20 W×10 s), i.e., the product of the predetermined time T1 and non-load power.

Figure 7:
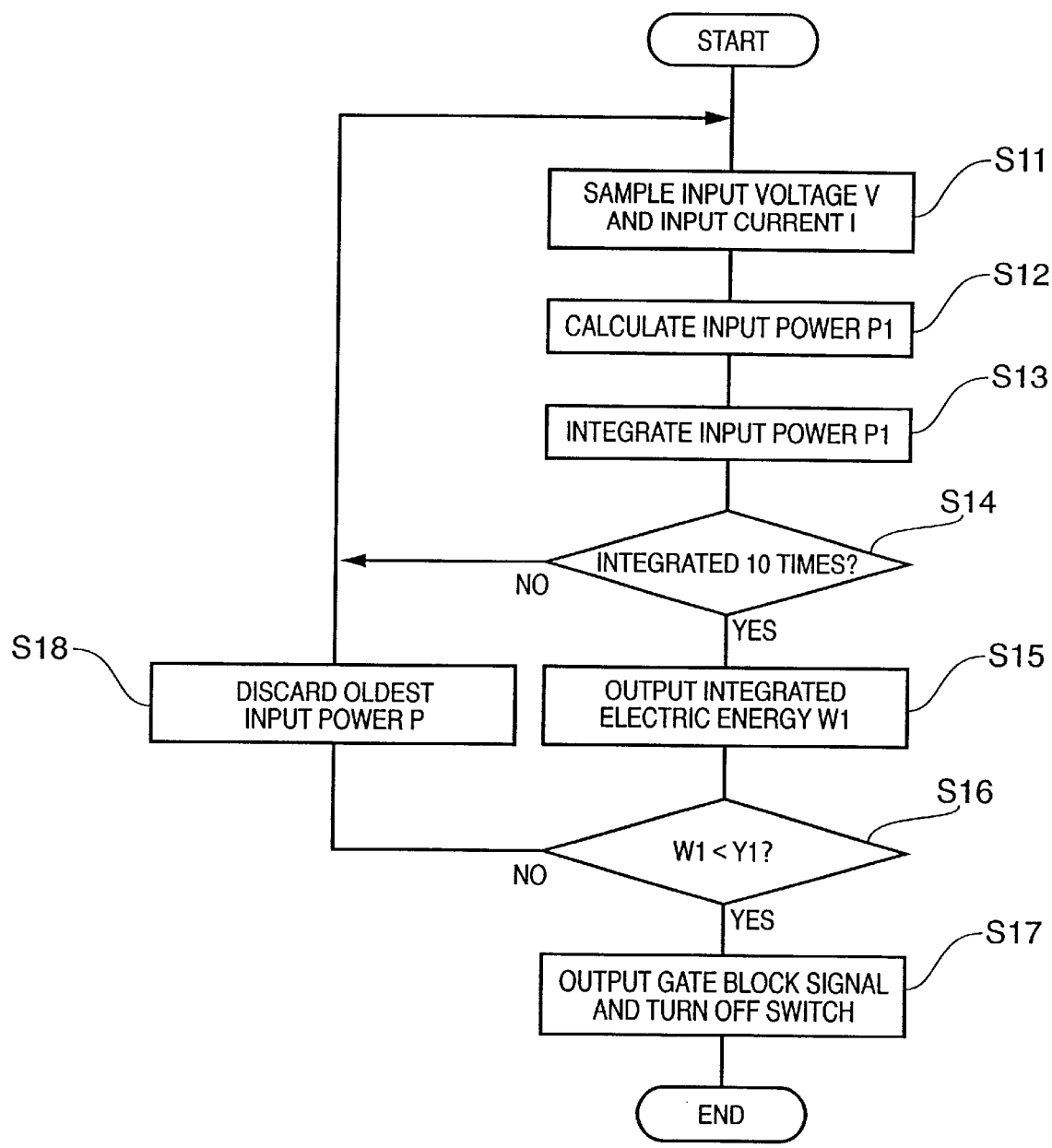
FIG. 7 is a flow chart for explaining an inverter stopping method of the first example.

FIG. 7 is a flow chart for explaining a method of stopping the inverter 2 of the first example.

A voltage detector 21 shown in FIG. 5 detects the input voltage V of the inverter 2 and supplies the detected value to an A/D converter 24. A current detector 22 detects an input current I of the inverter 2 and supplies the detected value to the A/D converter 24.

The A/D converter 24 converts each detected value to digital data every second and outputs the data to an integrated electric energy calculation section 25 (S11). The integrated electric energy calculation section 25 calculates the input power P1=V×I from the received digital data (S12) and adds 10 data of input power P1. That is, the input power P1 is integrated (S13). On the basis of the signal t (S14), the integrated electric energy W1 is output every second, and the next integration is started (S15).

A comparator 28 compares the integrated electric energy W1 with the threshold value Y1 (S16), and if W1<Y1, outputs a stop signal to a control section 29. When W1≧Y1, the oldest one of the above 10 data is discarded (S18). In the next integrated electric energy calculation, the remaining nine data and one newly input data of the input power P1, i.e., a total of 10 data are added. Upon receiving the stop signal, the control section 29 outputs a gate block signal and turns off a switch 210 (S17).

Stopping Method as Comparative Example

For the sake of comparison, a method of stopping a general inverter 2 will be described. The non-load power of the inverter 2, the arrangement of a solar battery 1, the form of a system 3, and the sampling interval are the same as in the above-described example.

A threshold value V1 is set at 198 V at which input power equals non-load power, as shown in FIG. 6. To suppress unnecessary stop of the inverter as much as possible, a predetermined time T2 is set at 20 sec, i.e., about twice the integration time T1.

Figure 8:
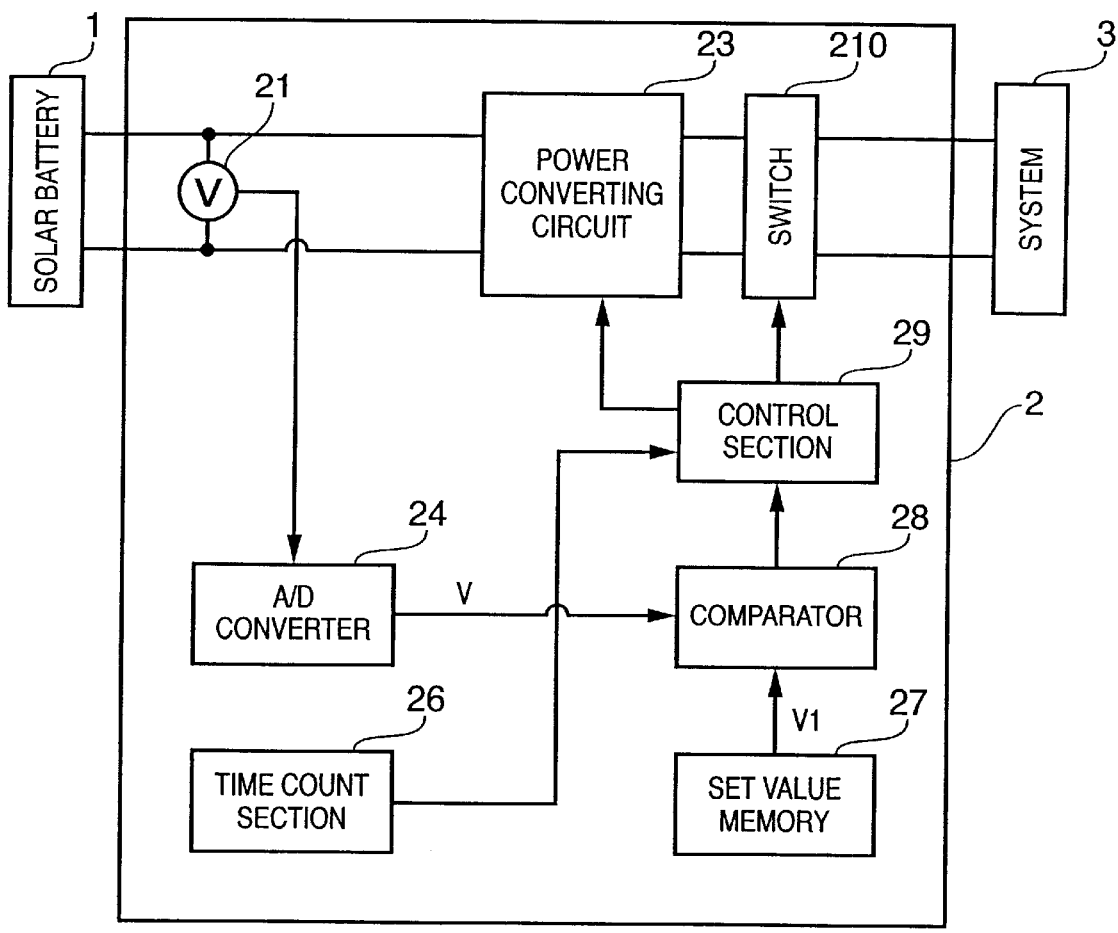
FIG. 8 is a block diagram showing the arrangement of a general inverter.
Figure 9:
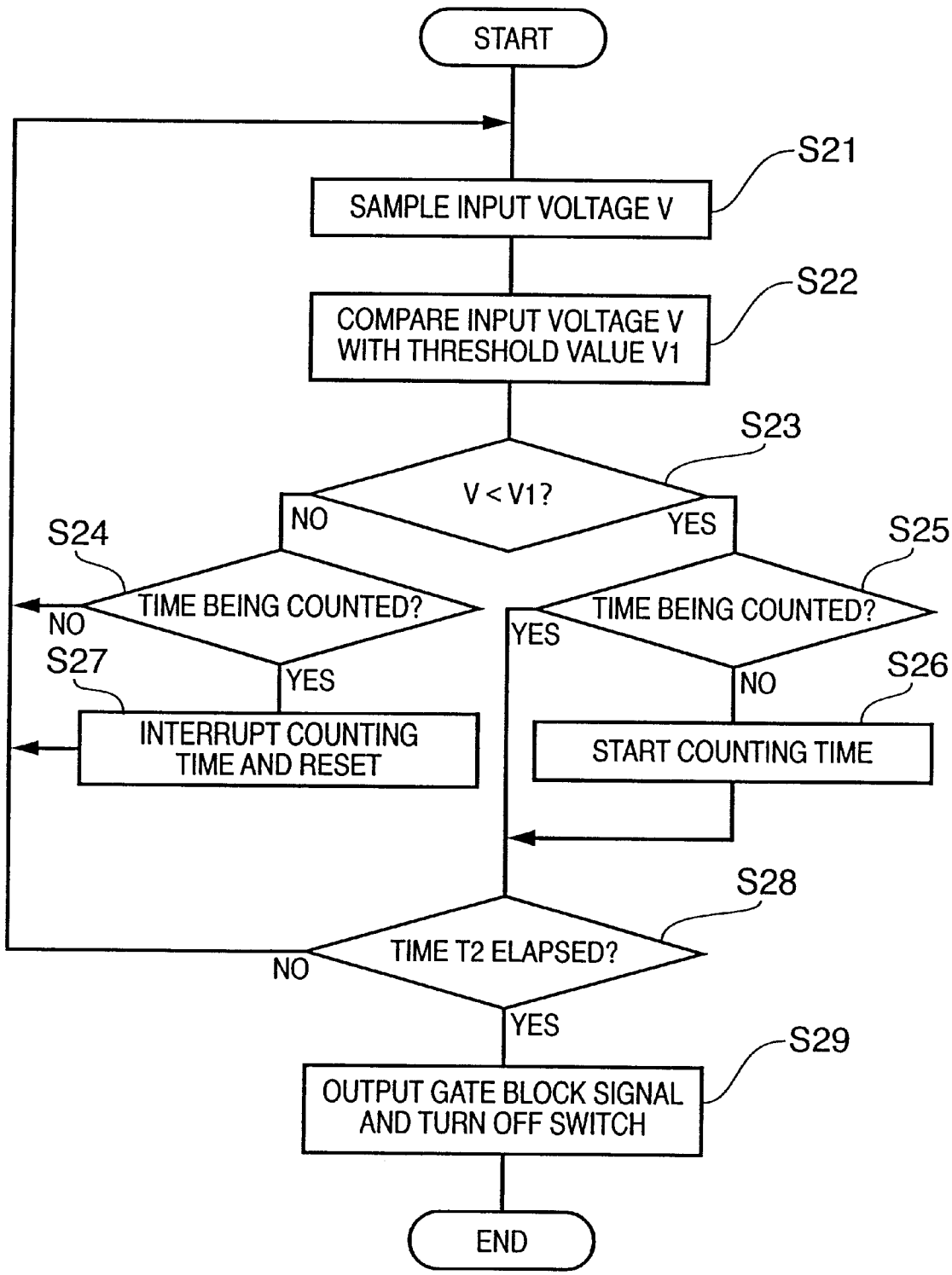
FIG. 9 is a flow chart showing a general inverter stopping method.

FIG. 8 is a block diagram showing the arrangement of the general inverter 2. FIG. 9 is a flow chart showing a general method of stopping the inverter 2.

A voltage detector 21 shown in FIG. 8 detects an input voltage V of the inverter 2 and supplies the detected value to an A/D converter 24.

The A/D converter 24 converts the detected value to digital data every second and outputs the data to a comparator 28 (S21). The comparator 28 compares the input voltage V with the threshold value V1 and outputs the comparison result to a control section 29 (S22).

The control section 29 determines whether V<V1 (S23) and whether time is being counted (S24 and S25). If V<V1 and time is not being counted, a time count section 26 is caused to start counting time (S26). If V≧V1 and time is being counted, the time count section 26 is caused to stop counting time and reset the count value (S27).

In addition, when V<V1, the control section 29 determines whether the count value indicates the elapse of the predetermined time T2 (S28). If YES in step S28, the control section 29 outputs a gate block signal and turns off a switch 210 (S29).

Hence, when a state wherein the input voltage V is less than the threshold value V1 (=198 V) continues for the predetermined time T2 (20 sec) or more, the operation of the inverter 2 is stopped.

Proof Experiment

A result of proof experiments for the stopping method of the first example and that of the comparative example will be described on the basis of FIG. 6.

First, under such conditions shown in FIG. 6 that the input power P1 abruptly decreased, an experiment was conducted with the stopping method of the comparative example. As a result, as shown in FIG. 6, the input voltage V became less than the threshold value V1 (=198 V) at a timing of 27 sec, and the inverter 2 was stopped at a timing of 47 sec after the elapse of the predetermined time T2 (=20 sec).

Next, under similar conditions, an experiment was conducted with the stopping method of the first example. As a result, as shown in FIG. 6, the integrated electric energy W1 became less than the threshold value Y1 (=200 Ws) and the inverter 2 was stopped at a timing of 30 sec. That is, the inverter 2 was stopped 3 sec after the input power P1 became smaller than the non-load power of 20 W.

As described above, with the stopping method of the first example, the inverter 2 was stopped faster by 17 sec as compared to the comparative example, and wasteful power consumption could be decreased.

SECOND EXAMPLE

Since power conversion by a power converting circuit 23 suffers a loss, the output power of an inverter 2 is smaller than input power. That is, whether the output power of the inverter 2 is smaller than non-load power can be more accurately determined on the basis of the output power. Hence, stop of the inverter 2 is more preferably controlled on the basis of the output power than input power P1.

Figure 10:
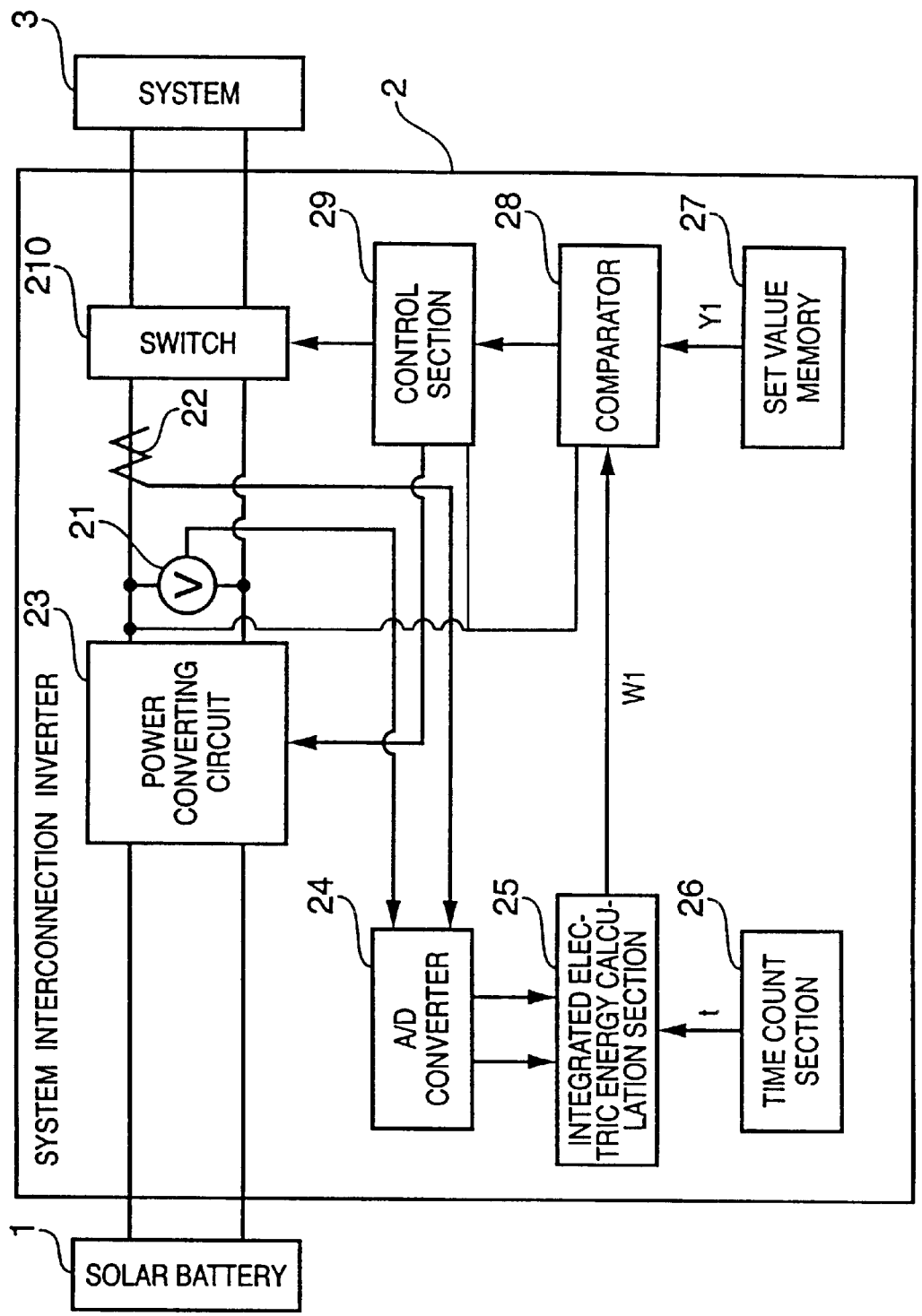
FIG. 10 is a block diagram showing the detailed arrangement of an inverter of the second example.

The inverter 2 of the second example is stopped on the basis of not the input power P1 but output power P2, as shown in FIG. 10. The arrangement and operation of the inverter 2 are the same as in the first example except that a voltage detector 21 and current detector 22 are inserted between the power converting circuit 23 and a switch 210, and an integrated electric energy calculation section 25 calculates alternating current power.

Figure 11:
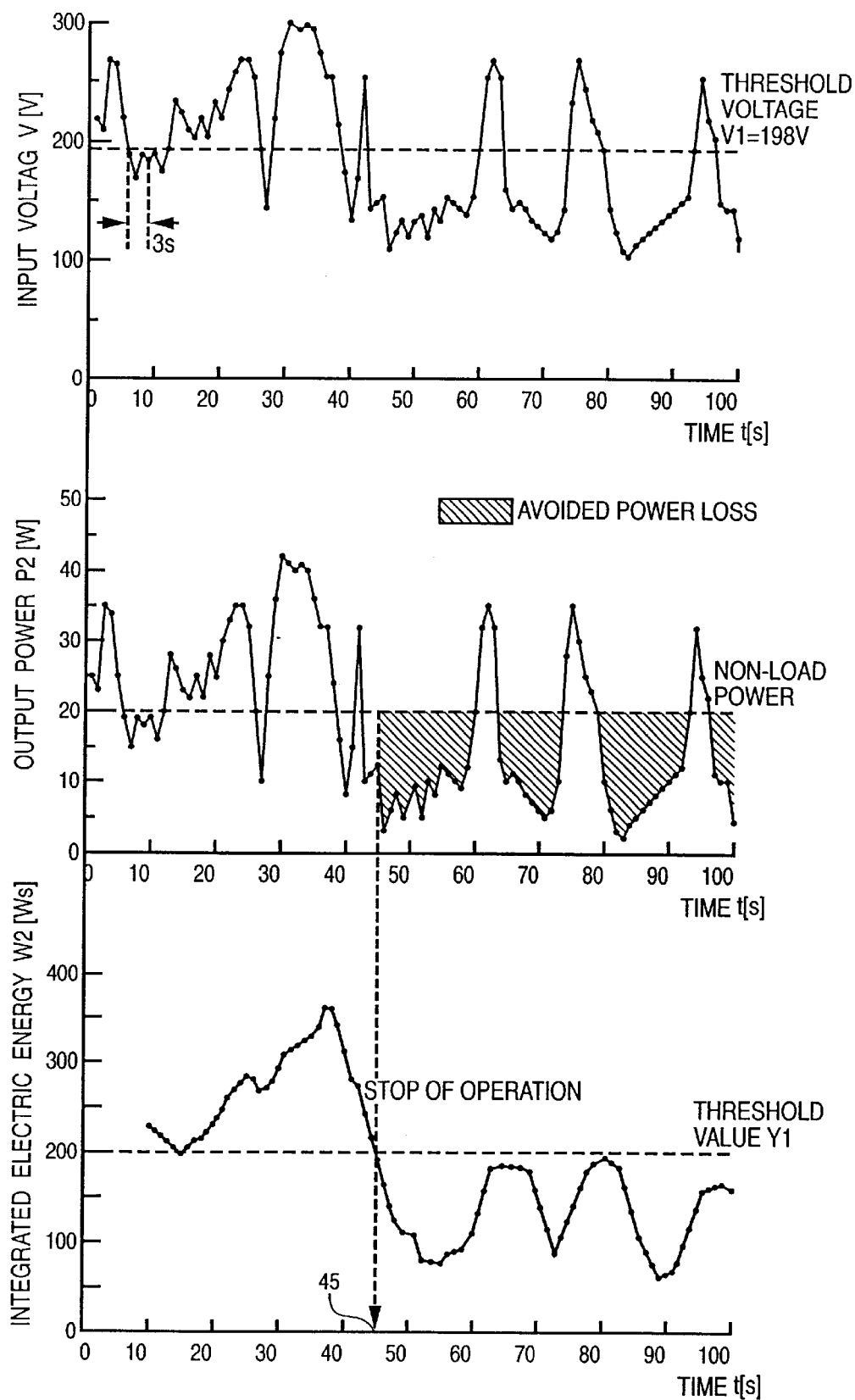
FIG. 11 shows timing charts showing the relationship between an input voltage V, output power P2, and integrated electric energy W1.

FIG. 11 shows timing charts showing the relationship between an input voltage V [V], output power P2 [W], and integrated electric energy W1 {Ws} at time [t]. In this example, the output power P2 fluctuates near non-load power of 20 W.

Under such conditions, an experiment was conducted with the stopping method of the comparative example. As a result, as shown in FIG. 11, the input voltage V became less than the threshold value V1 (=198 V) many times but not continuously for a predetermined time T2 (=20 sec), and the inverter 2 was continuously operated. For this reason, during a period when the output power P2 was smaller than the non-load power, power corresponding to the shortage was supplied from a system 3. A similar experiment was conducted with the stopping method of the comparative example, for which the predetermined time T2 was shortened to 3 sec corresponding to a delay time T3. The inverter 2 was stopped at a timing of 6 sec immediately after the start of operation.

Under the same conditions, an experiment was conducted with the stopping method of the second example. As a result, as shown in FIG. 11, the integrated electric energy W1 became less than a threshold value Y1 (=200 Ws) at a timing of 45 sec, and the inverter 2 was stopped. Hence, from a timing of 50 sec, no power corresponding to the shortage of the non-load power was supplied from the system 3.

THIRD EXAMPLE

Figure 12:
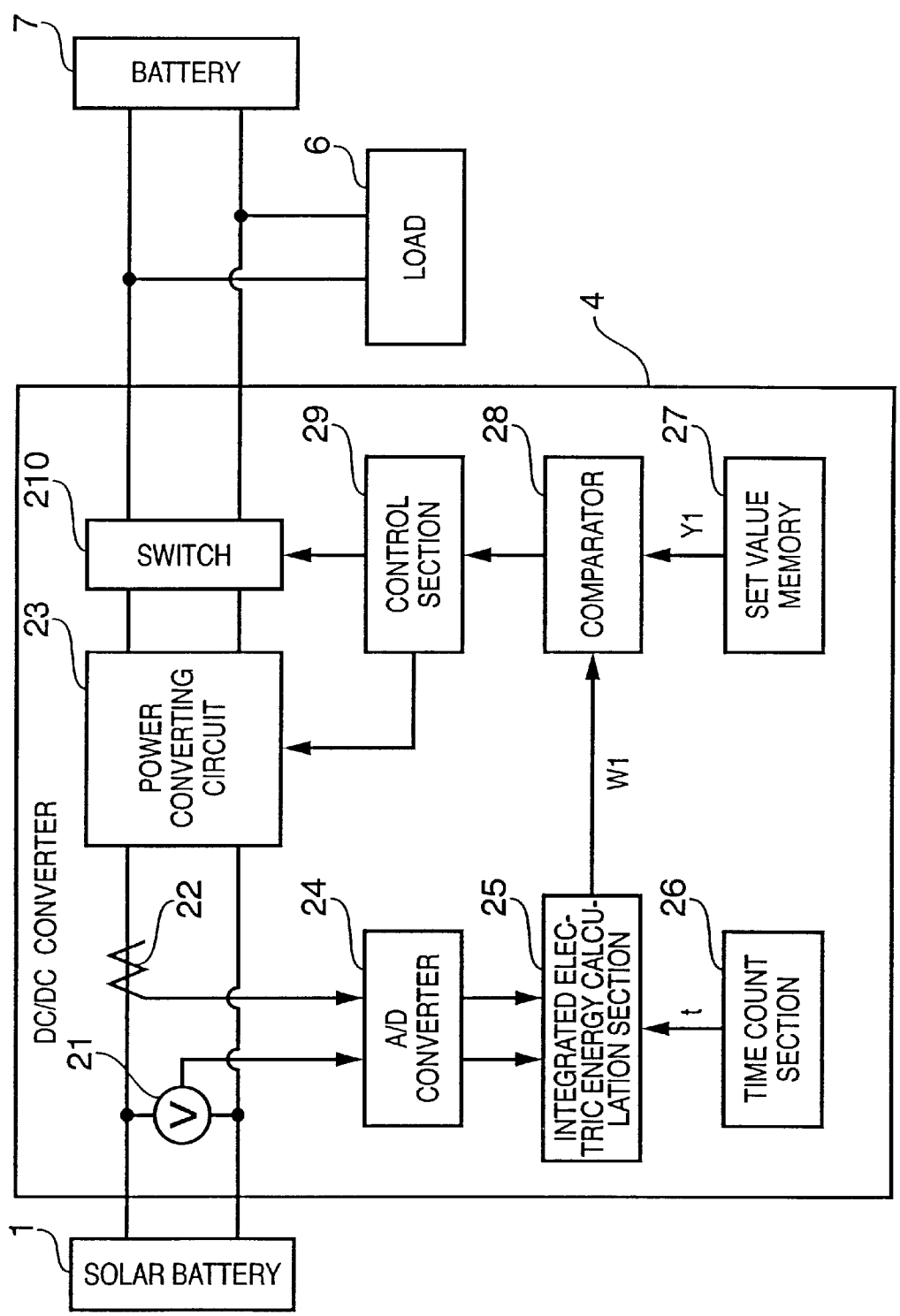
FIG. 12 is a block diagram showing the detailed arrangement of a converter of the third example.
Figure 13:
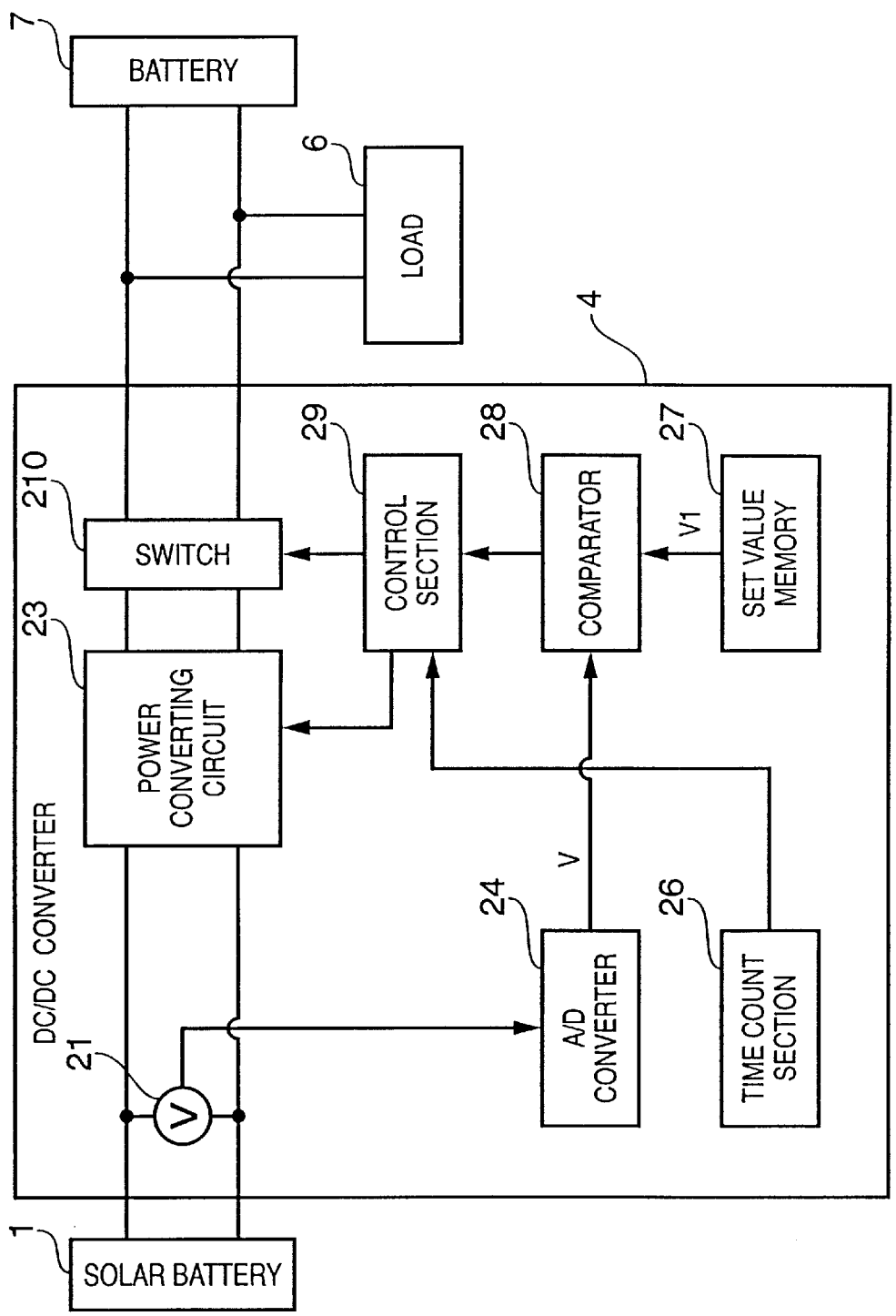
FIG. 13 is a block diagram showing the arrangement of a general converter.

In the third example, a DC/DC converter 4 is used as an inverter such that direct current power supplied from a solar battery 1 is converted to direct current power having a desired voltage and supplied to a load 6 and battery 7, as shown in FIGS. 12 and 13.

The arrangement of the main circuit of the DC/DC converter 4 is the same as that of a general converter. When a lead battery of 12 V is used as the battery 7, the output voltage of a power converting circuit 23 is about 13 V. The non-load power for the DC/DC converter 4 is supplied from the output (battery 7) side.

As the load 6, a heating lamp of 12 V and 100 W is used as a general electric load. As the battery 7, a lead battery of 12 V and 100 Ah is used as a general secondary battery.

Note that the DC/DC converter 4 shown in FIG. 12 executes the stopping method of the third example, and the DC/DC converter 4 shown in FIG. 13 executes the stopping method of the comparative example.

Under almost the same conditions as in FIG. 6, almost the same proof experiments as in the first example were conducted. As in the first example, in the stopping method of the comparative example, the operation of the DC/DC converter 4 was continued, and the power of the battery 7 was consumed during a predetermined time T2 from when input power P1 became smaller than the non-load power (=20 W). On the other hand, in the stopping method of the third example, when the input power P1 became smaller than the non-load power, the operation of the DC/DC converter 4 was stopped at a timing of 30 sec so that wasteful power consumption could be suppressed.

Under almost the same conditions as in FIG. 11, almost the same proof experiments in the second example were conducted. Instead of integrating output power P2 shown in FIG. 11, the input power P1 was integrated. As a result, as in the second example, in the stopping method of the comparative example, the operation of the DC/DC converter 4 was continued, and the power of the battery 7 was continuously consumed. When the predetermined time T2 was shortened to 3 sec corresponding to a delay time T3, the operation of the DC/DC converter 4 was stopped at a timing corresponding to 6 sec in FIG. 11. On the other hand, in the stopping method of the third example, the operation of the DC/DC converter 4 was stopped at a timing corresponding to 45 sec in FIG. 11 when an integrated electric energy W1 became less than a predetermined value Y1 (=200 Ws).

As described above, according to this embodiment, independently of the form such as alternating current output or direct current output or the form such as a system interconnection type or stand-alone (isolated operation) type, operation when the output power of the generator is smaller than the non-load power can be avoided, and unnecessary stop can be suppressed. When the generator of this embodiment is connected to a system or the like, an efficient generator can be implemented in consideration of a decrease in generated power in the morning/evening or in a cloudy/rainy day.

As many apparently widely different embodiments of the present invention can be made without departing from the spirit and scope thereof, it is to be understood that the invention is not limited to the specific embodiments thereof except as defined in the appended claims.

What is claimed is:

1. A power converting apparatus comprising:

a power converter, arranged to convert direct current power to alternating current power;

a measurement unit, arranged to measure input or output power of said power converter and calculate integrated power for every predetermined period on the basis of the measured power; and a controller, arranged to stop conversion operation of said power converter when the integrated power is less than a predetermined value.

2. The apparatus according to claim 1, wherein power for operating said measurement unit and controller is supplied from an output side of said power converter.

3. The apparatus according to claim 1, wherein the direct current power is supplied from a solar battery, and the alternating current power output from said power converter is supplied to a commercial electric power system.

4. A power converting apparatus comprising:

a power converter, arranged to convert input direct current power to direct current power having a different voltage;

a measurement unit, arranged to measure input or output power of said power converter and calculate integrated power for every predetermined period on the basis of the measured power; and a controller, arranged to stop conversion operation of said power converter when the integrated power is less than a predetermined value.

5. The apparatus according to claim 4, wherein power for operating said measurement unit and controller is supplied from an output side of said power converter.

6. The apparatus according to claim 4, wherein the input direct current power is supplied from a solar battery, and the direct current power output from said power converter is supplied at least to a secondary battery.

7. A generator for generating electric power comprising:

a power converting apparatus comprising (i) a power converter, arranged to convert direct current power to alternating current power, (ii) a measurement unit, arranged to measure input or output power of said power converter and calculate integrated power for every predetermined period on the basis of the measured power, and (iii) a controller, arranged to stop conversion operation of said power converter when the integrated power is less than a predetermined value.

8. A generator for generating electric power comprising:

a power converting apparatus comprising (i) a power converter, arranged to convert input direct current power to direct current power having a different voltage, (ii) a measurement unit, arranged to measure input or output power of said power converter and calculate integrated power for every predetermined period on the basis of the measured power; and (iii) a controller, arranged to stop conversion operation of said power converter when the integrated power is less than a predetermined value.

9. A control method of a power converting apparatus for converting direct current power to alternating current power, comprising the steps of:

measuring input or output power of the apparatus;

calculating integrated power for every predetermined period on the basis of the measured power; and stopping conversion operation of the apparatus when the integrated power is less than a predetermined value.

10. A control method of a power converting apparatus for converting input direct current power to direct current power having a different voltage, comprising the steps of:

measuring input or output power of the apparatus;

calculating integrated power for every predetermined period on the basis of the measured power; and stopping conversion operation of the apparatus when the integrated power is less than a predetermined value.

* * * * *

UNITED STATES PATENT AND TRADEMARK OFFICE
CERTIFICATE OF CORRECTION

PATENT NO.     : 6,493,246 B2
DATED          : December 10, 2002
INVENTOR(S)    : Masaki Suzui It is certified that error appears in the above-identified patent and that said Letters Patent is hereby corrected as shown below:

Drawings,
Sheet 6, Figure 6, "VOLTATE" should read -- VOLTAGE --.
Sheet 11, Figure 11, "VOLTAG" should read -- VOLTAGE --.

Signed and Sealed this

Ninth Day of March, 2004

JON W. DUDAS
*Acting Director of the United States Patent and Trademark Office*